Figure 1:
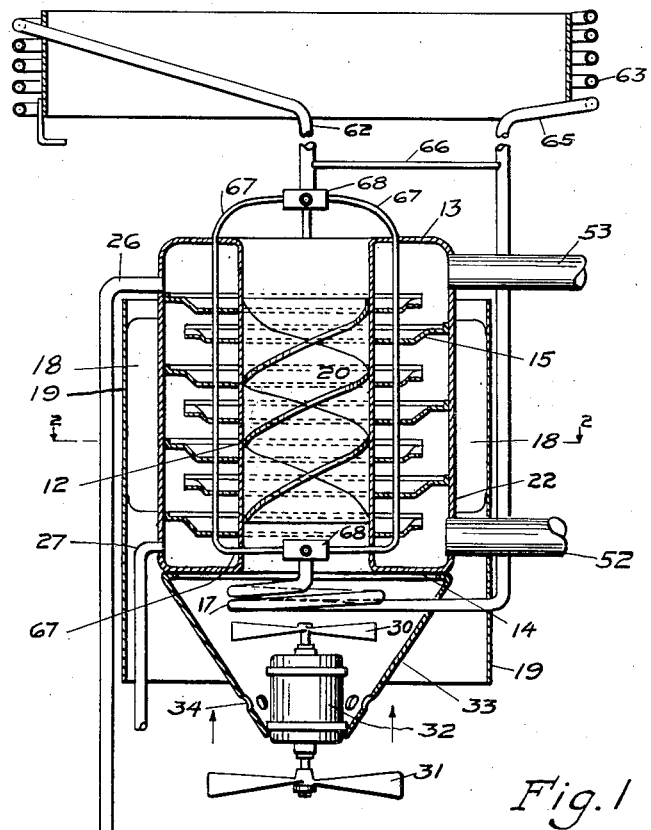

Oct. 17, 1933. R. S. NELSON 1,930,657
AIR COOLED ABSORBER FOR REFRIGERATING SYSTEMS

Filed May 7, 1932

Inventor
Rudolph S. Nelson

Harry S. Demarse
Attorney

Patented Oct. 17, 1933

1,930,657

UNITED STATES PATENT OFFICE 1,930,657

AIR COOLED ABSORBER FOR REFRIGERATING SYSTEMS

Rudolph S. Nelson, Rockford, Ill., assignor to The Hoover Company, North Canton, Ohio, a corporation of Ohio Application May 7, 1932. Serial No. 609,791

6 Claims. (Cl. 62—119.5)

This invention relates to absorption refrigeration systems and more particularly to means for air cooling the absorber thereof.

Considerable difficulty has been experienced in air cooling small sized absorption refrigerating systems due to the fact that the absorber, which must discharge heat to the air cannot always be conveniently located when installed in a cabinet and sufficient air does not circulate around it to effectively cause the discharge of heat therefrom.

In accordance with the present invention it is proposed to employ a small electric motor equipped with one or more fans to circulate air over the absorber in an advantageous manner and also to provide an absorber construction together with means for indirectly cooling the same which shall offer a large area of contact with the air currents developed by the fan or fans so as to permit a discharge of a large amount of heat from the absorber to the air.

In my copending application Serial No. 539,450 filed May 23, 1931 for Absorption refrigeration, there is disclosed an air cooled absorption refrigerating system in which an indirect cooling arrangement is provided for cooling the absorber or a portion thereof. The present invention relates to an absorber which may be used in such a system and in this specification the parts which correspond to the system disclosed in this copending case are designated by similar reference characters.

One object of the present invention is to provide means for adequately air cooling an absorber or other device located in a confined space and to cool the liquid therein.

It is a further object to provide an absorber construction in which a large heat radiating surface is provided over which currents of air are circulated to thereby promote a large amount of absorption of the refrigerant in proportion to the size of the absorber.

It is a further object of the invention to provide a novel fan construction which cooperates with the absorber cooling means to facilitate the discharge of heat from the absorber to the surrounding air.

Another object is to provide a novel arrangement in which air circulating means cooperates with an indirect cooling system for an absorber or other vessel to adequately cool the same.

Figure 2:
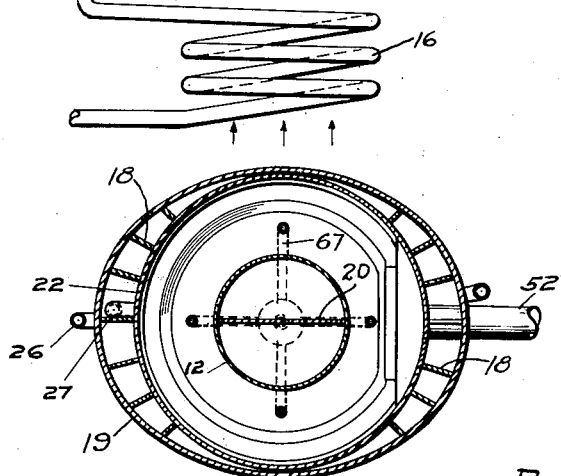

Other objects and advantages reside in certain novel arrangements and construction of parts as will be apparent from a consideration of the following description taken in connection with the accompanying drawing in which:

Figure 1 is a vertical view, partly in cross section, of an absorber, together with means for cooling the same; and Figure 2 is a horizontal cross sectional view taken on the lines 2—2 of Figure 1.

Referring to the drawing an absorber is shown as consisting of two concentrically disposed cylinders of seamless steel tubing or the like, designated 12 and 22 respectively. These cylinders are connected at their upper and lower ends by annular plates 13 and 14 to thus provide a closed vessel. Baffle plates 15 of any suitable type are mounted in the interior of this vessel to provide an arrangement for bringing absorption liquid such as water into contact with the gas to be absorbed, such as ammonia, as the absorption liquid trickles down over the baffle plates and the refrigerant gas passes upwardly through the vessel. The absorption liquid may be supplied to the vessel through a conduit 26 the lower portion of which may be bent into a coil as indicated at 16. After the absorption liquid trickles down through the absorber vessel, it may be carried away through a conduit 27. If the system in which the absorber is employed is of the type shown in my copending application referred to above, a quantity of refrigerant gas and inert gas may be supplied to the lower part of the absorber vessel through the conduit 52 and after passing upwardly through the absorber vessel exit through the conduit 53. It is obvious however that the invention is not limited to use in a system employing an inert gas.

An indirect cooling system for the absorber vessel consists of a series of small pipes 67 which pass through the upper and lower end plates 13 and 14 and connected to each other at points above and below the absorber vessel by header 68 as indicated. The pipes 67 themselves are sufficiently small to function as gas lift pumps upon the generation of gas therein and thus cause movement of liquid from the lower header 68 through the conduit 67 into the upper header 68 as will be presently described. The upper header 68 is connected to a conduit 62 which acts as a gas separating chamber and is in turn connected to a coil 63 which may be located near the top of the refrigerator cabinet associated with the system. A conduit 65 connects the lower end of the coil 63 to the lower header 68 a portion of this conduit 65 being bent into the form of a coil as indicated at 17. A small conduit 66 connects the lower portion of the pipe 62 to the pipe 65.

This cooling system may be filled with liquid such as ammonia up to a level somewhat above the horizontal conduit 66. Upon heat being transferred from the absorption vessel to the pipes 67, a portion of the refrigerant will be vaporized and will pass upwardly through these conduits and in so doing carry the remainder of the liquid into the gas separating chamber 62. From the gas separating chamber the liquid will flow through the conduit 66 into the lower portion of the conduit 65 and return to the gas lift pumps 67. The generated vapor conveyed to the gas separating chamber 62 will pass into the coil 63 where it will condense and return to the lower header 68 through the return pipe 65. In this way the absorber vessel is cooled partly by convection of the liquid refrigerant which circulates through the conduit 66 and the lower portion of pipe 65 and partly by vaporization of liquid refrigerant which circulates through the conduits 67, the condenser 63 and the return conduit 65.

The absorber and cooling system described above is similar to that disclosed in my copending application Serial No. 539,450 referred to above. The present invention relates to additional means for cooling the absorber and to means for cooperating with the indirect cooling system described above to increase its efficiency.

To provide additional heat radiating means on the outer cylinder 22 of the absorber vessel, vertically disposed cooling fins are provided along the sides thereof as indicated at 18. An outer oval or elliptical member 19 is fitted around the radiating fins 18 and is connected thereto so as to aid in the transfer of heat to the air and also to serve as guiding means for air currents directly over the fins 18. Also the inside of the inner cylinder 12 of the absorption vessel is provided with a spiral member 20 which facilitates the discharge of heat therefrom.

To cause the passage of a current of air over the heat radiating surfaces 18, 19 and 20 and the parts of the absorber to which they are connected, two fans are provided as indicated at 30 and 31, these being located below the absorber vessel and driven by a suitable electric motor indicated at 32. The motor 32 is supported by means of a conical member 33 attached to the lower portion of the absorber vessel, this support also acting as a guiding means for the current of air generated by the fan 31. The lower portion of the cone 32 is provided with openings as indicated at 34 to permit air to enter the cone below the fan 30.

It will be noticed that the coil 16 in the conduit 26 which supplies absorption liquid to the absorber is located below the fan 31. This provides an arrangement for precooling the liquid before it enters the absorption vessel. The air current generated by fan 31 after passing around the coil 16 is deflected outwardly by the cone 33 and flows upwardly across the radiating surfaces 18, 19 and 22 and then upwardly across the coil 63 of the indirect cooling system.

Likewise the fan 30 directs the current of air over the coil 17 of the indirect cooling system and upwardly through the central flue of the absorber vessel provided by the inner cylinder 12, and in contact with this cylinder as well as the heat radiating spiral 20 therein.

Thus means is provided for adequately air cooling the absorber vessel. While only one embodiment of the invention has been shown and described herein it is obvious that various changes may be made in the construction and arrangement of the parts without departing from the spirit of the invention and that the invention may be employed in an arrangement in which the absorber vessel constitutes the whole or only a part of the absorber of the refrigerating system as well as in connection with parts other than the absorber.

I claim:

1. An arrangement for air cooling an absorber vessel of a refrigerating system having a flue through a portion thereof which includes a fan located below the absorber for directing air through the flue, an indirect cooling system having fluid conduits passing through the interior of said vessel and means outside said vessel for providing a closed circuit for the fluid in said conduits and having a heat radiating element disposed in the path of the air currents set up by said fan.

2. In a refrigerating system the combination with an absorber having a flue through a portion thereof and heat discharging means on the outside thereof, of air propelling means for causing a current of air to pass through said flue and separate air propelling means for causing another current of air to pass over said heat discharging means.

3. In a refrigerating system, the combination of a vessel designed to give up heat to the atmosphere and having a flue through a portion thereof and heat discharging means on the outside thereof, and air propelling means for causing one current of air to pass through said flue and another current of air to pass over said heat discharging means.

4. In a refrigerating system the combination with an absorber of fan means for causing the flow of air over heat discharging means thereon, and a conduit for supplying absorption liquid to said absorber and having a portion thereof located below the absorber in the air stream generated by said fan means whereby the absorber is air cooled and the liquid carried by said conduit is air cooled before it enters the absorber and without being exposed to the heated air passed over the absorber.

5. In a refrigerating system, the combination with an absorber of fan means causing the flow of air over heat discharging means thereon, a conduit for supplying absorption liquid to said absorber and having a portion thereof located in the air stream generated by said fan means whereby the absorber is air cooled and the liquid carried by said conduit is air cooled before it enters the absorber, and an indirect cooling system for said absorber and having a portion thereof located in the air stream generated by said fan means below the absorber to be cooled by the air stream before the latter passes over the absorber.

6. In a refrigerating system, the combination with an absorber of fan means for causing the flow of air over heat discharging means thereon, a conduit for supplying absorption liquid to said absorber and having a portion thereof located in the air stream generated by said fan means whereby the absorber is air cooled and the liquid carried by said conduit is air cooled before it enters the absorber and means for circulating a cooling liquid through said absorber, said last mentioned means including a conduit located in the air stream generated by said fan means a portion of the conduit being below the absorber and another portion of the conduit being above the absorber, the portion below the absorber being cooled by the air stream before the air stream passes over the absorber.

RUDOLPH S. NELSON.